United States Patent [19]
Martin

[11] Patent Number: 5,139,388
[45] Date of Patent: Aug. 18, 1992

[54] LOAD FORMER—PALLETIZER

[76] Inventor: Merrill D. Martin, 5405 Bacon Rd., Oakland, Calif. 94619

[21] Appl. No.: 646,210

[22] Filed: Jan. 28, 1991

[51] Int. Cl.$^5$ .............................................. B65G 57/24
[52] U.S. Cl. ................................. 414/799; 414/791.6; 414/922; 414/927
[58] Field of Search ................. 414/799, 789.9, 789.5, 414/790.3, 792, 792.7, 791.2, 791.6, 792.5, 793.8, 794.7, 794.8, 927, 902, 922; 198/374, 369, 367, 415

[56] References Cited

U.S. PATENT DOCUMENTS

| | | | |
|---|---|---|---|
| 2,633,251 | 3/1953 | Bruce | 414/927 X |
| 3,050,199 | 8/1962 | McGrath et al. | 414/902 X |
| 3,247,981 | 4/1966 | Johnson | 414/902 X |
| 3,594,977 | 7/1971 | Grasvoll | 414/791.6 X |
| 3,827,577 | 8/1974 | Kurk et al. | 414/927 X |
| 3,902,609 | 9/1975 | Ohlsson | 414/799 X |
| 3,978,970 | 9/1976 | Reimers | 414/789.5 |
| 3,983,373 | 9/1976 | Russell | 414/799 X |
| 4,067,456 | 1/1978 | Schmitt | 414/793.8 X |
| 4,221,519 | 9/1980 | Nord et al. | 414/795.2 X |
| 4,271,755 | 6/1981 | Kintgen et al. | 414/927 X |
| 4,311,425 | 1/1982 | Pulda | 414/799 |
| 4,354,786 | 10/1982 | Spitler | 414/799 X |
| 4,708,564 | 11/1987 | Mylrea et al. | 414/791.6 X |
| 4,978,275 | 12/1990 | Reid et al. | 414/789.5 |
| 4,984,963 | 1/1991 | Bon | 414/799 X |
| 4,993,907 | 2/1991 | Clark | 414/789.5 X |

Primary Examiner—Robert J. Spar
Assistant Examiner—Brian K. Dinicola
Attorney, Agent, or Firm—Alfons Puishes

[57] ABSTRACT

A machine receives packages in bundles and transports them over a series of conveyors to arrange them in suitable layers for stacking into solid stacks or loads of predetermined form or arrangement for palletizing or other conveying means. Each conveyor performs related functions of rotating packages in a horizontal plane, moving transversely and delivering in the predetermined pattern to form layers of an eventual stack for further transportation. Provision is made for insertion of sheets between layers as they are formed.

2 Claims, 20 Drawing Sheets

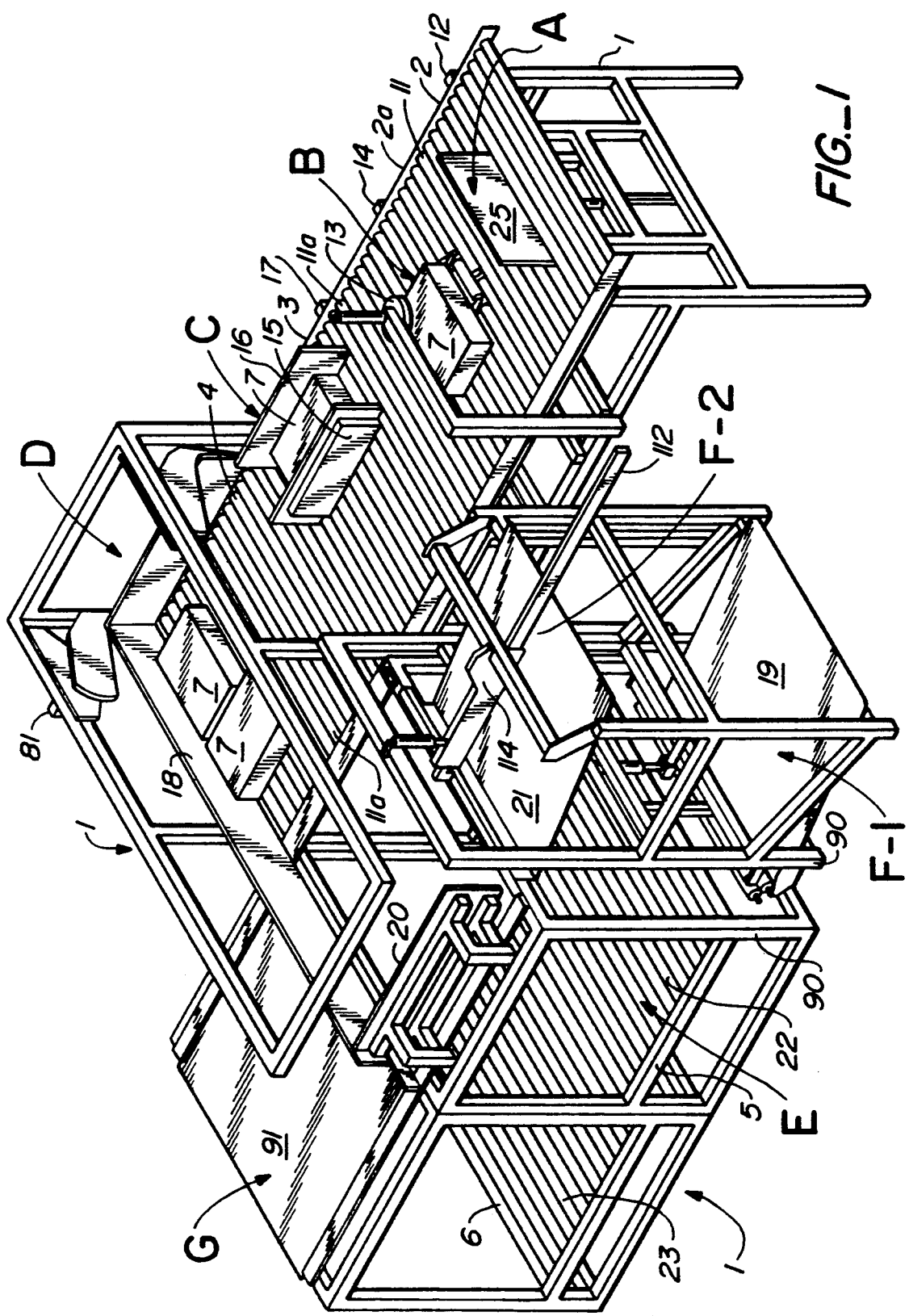

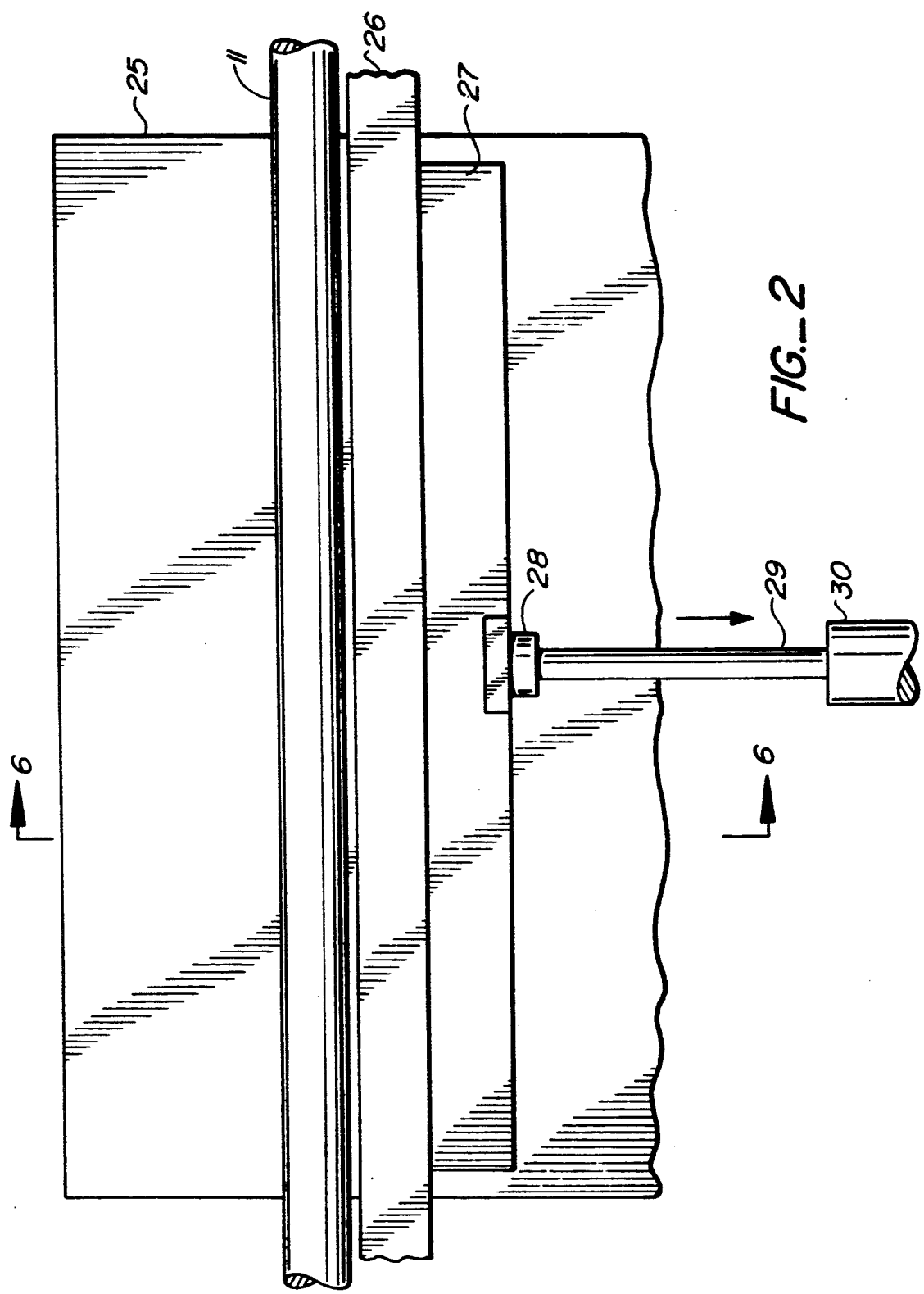

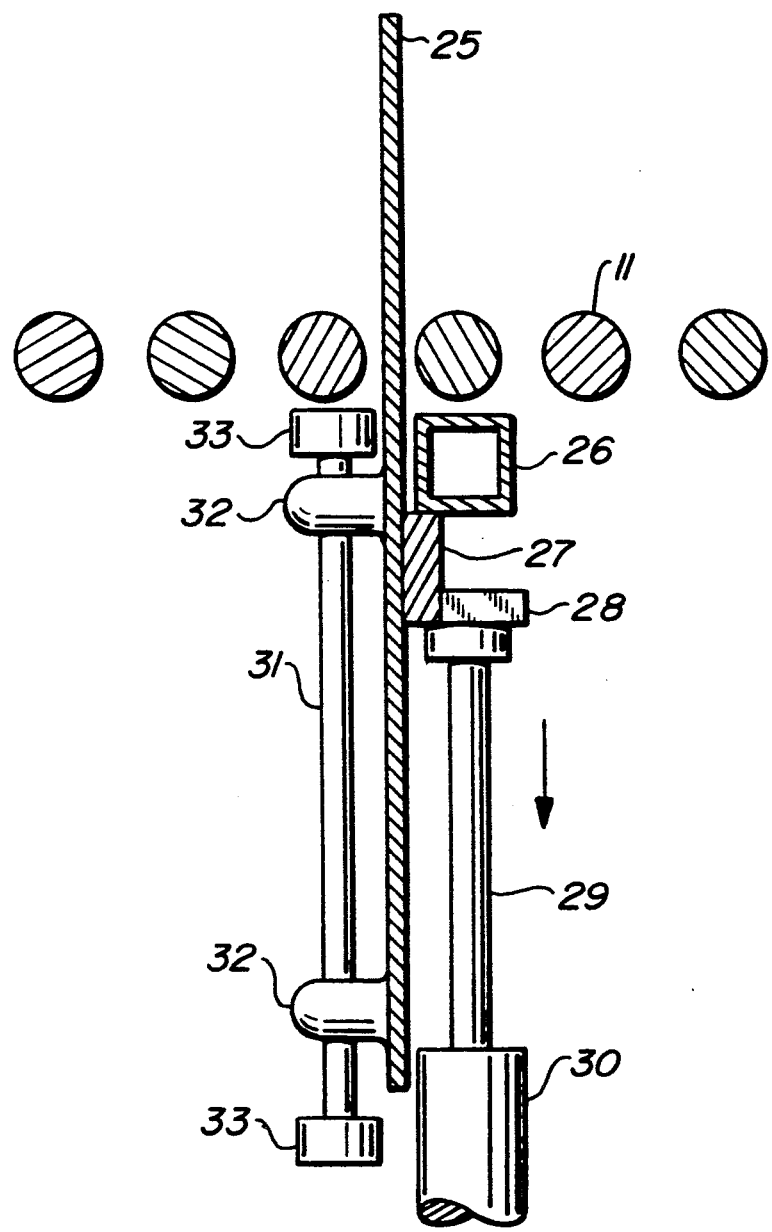
FIG._3

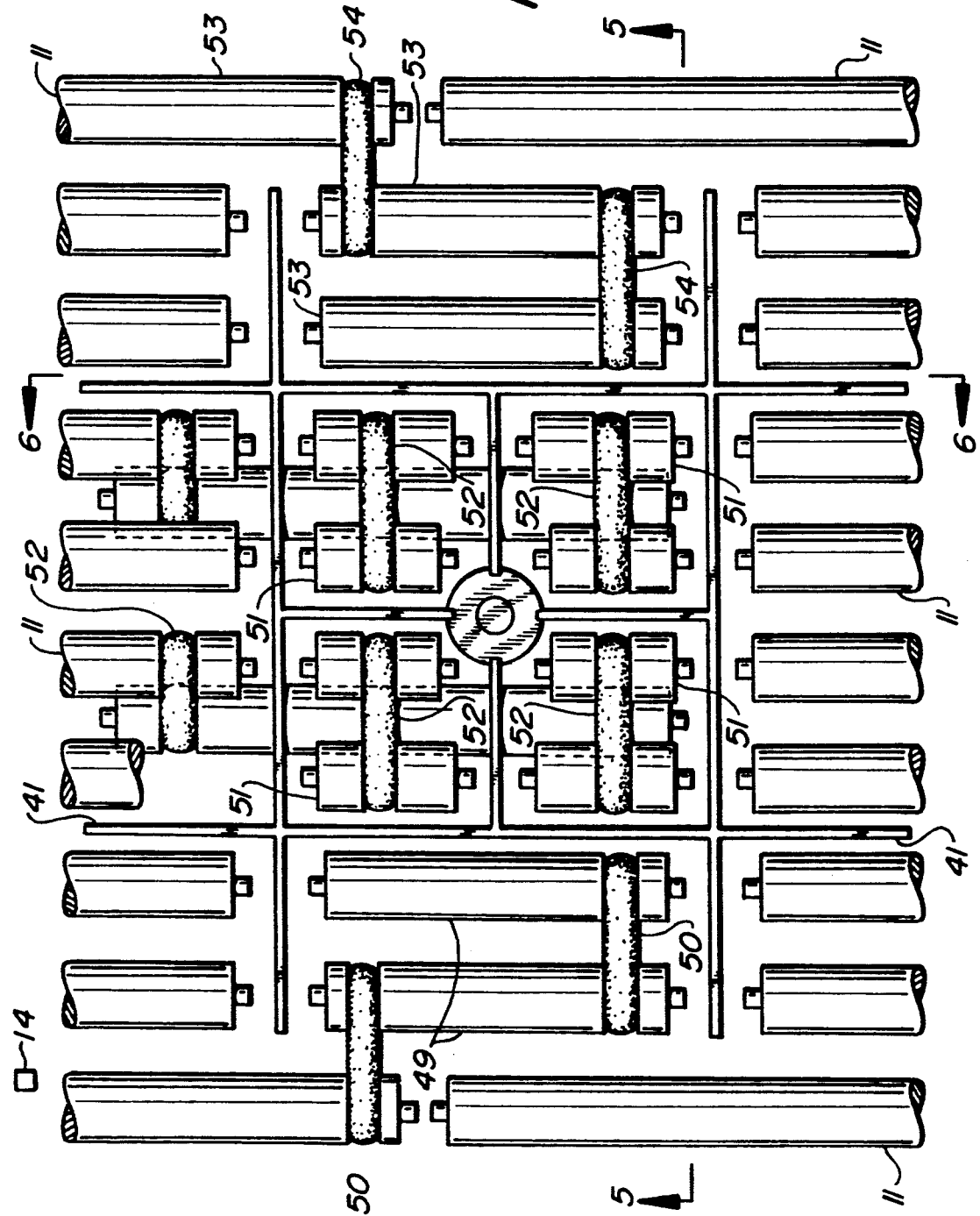
FIG._4

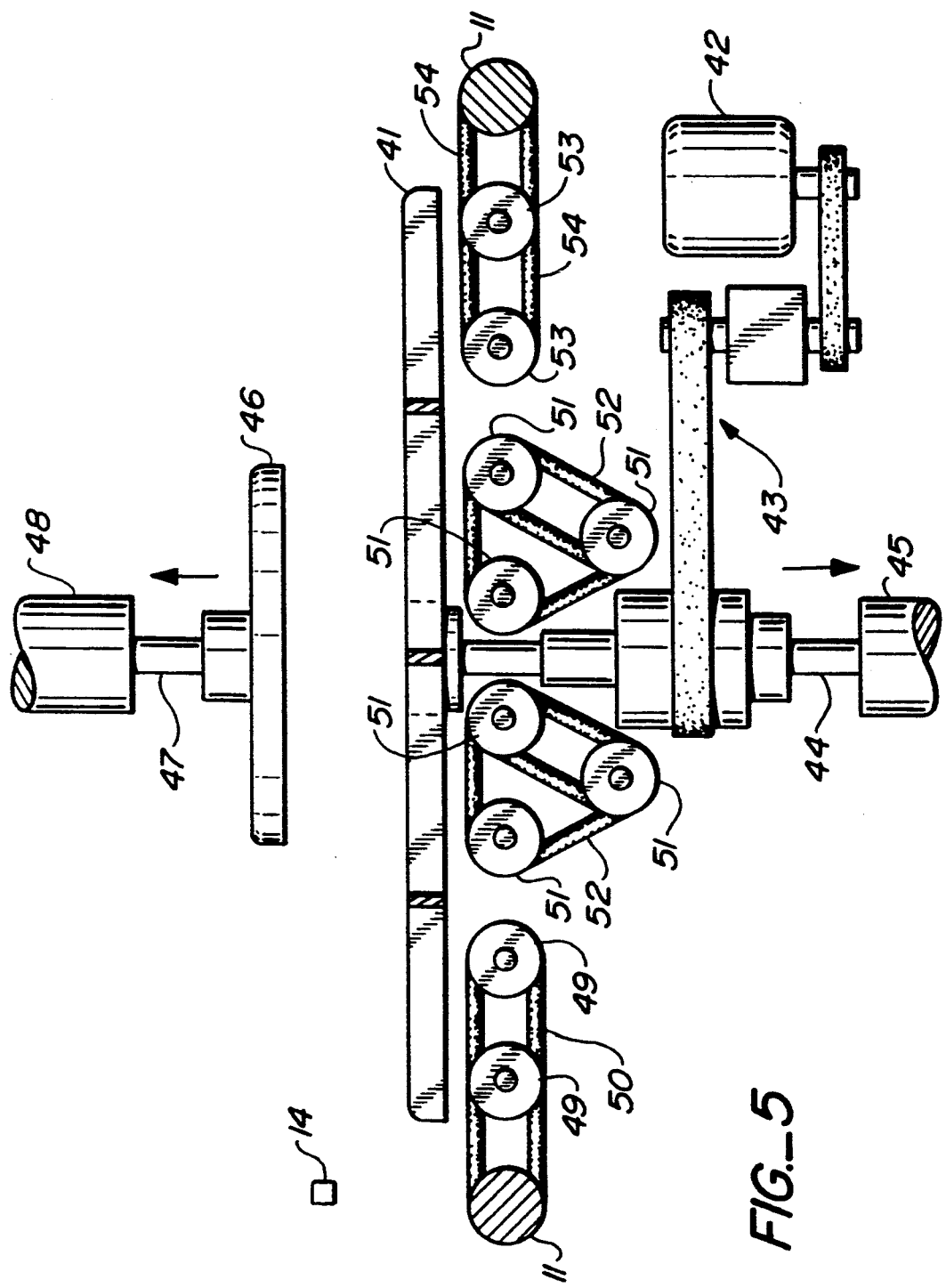

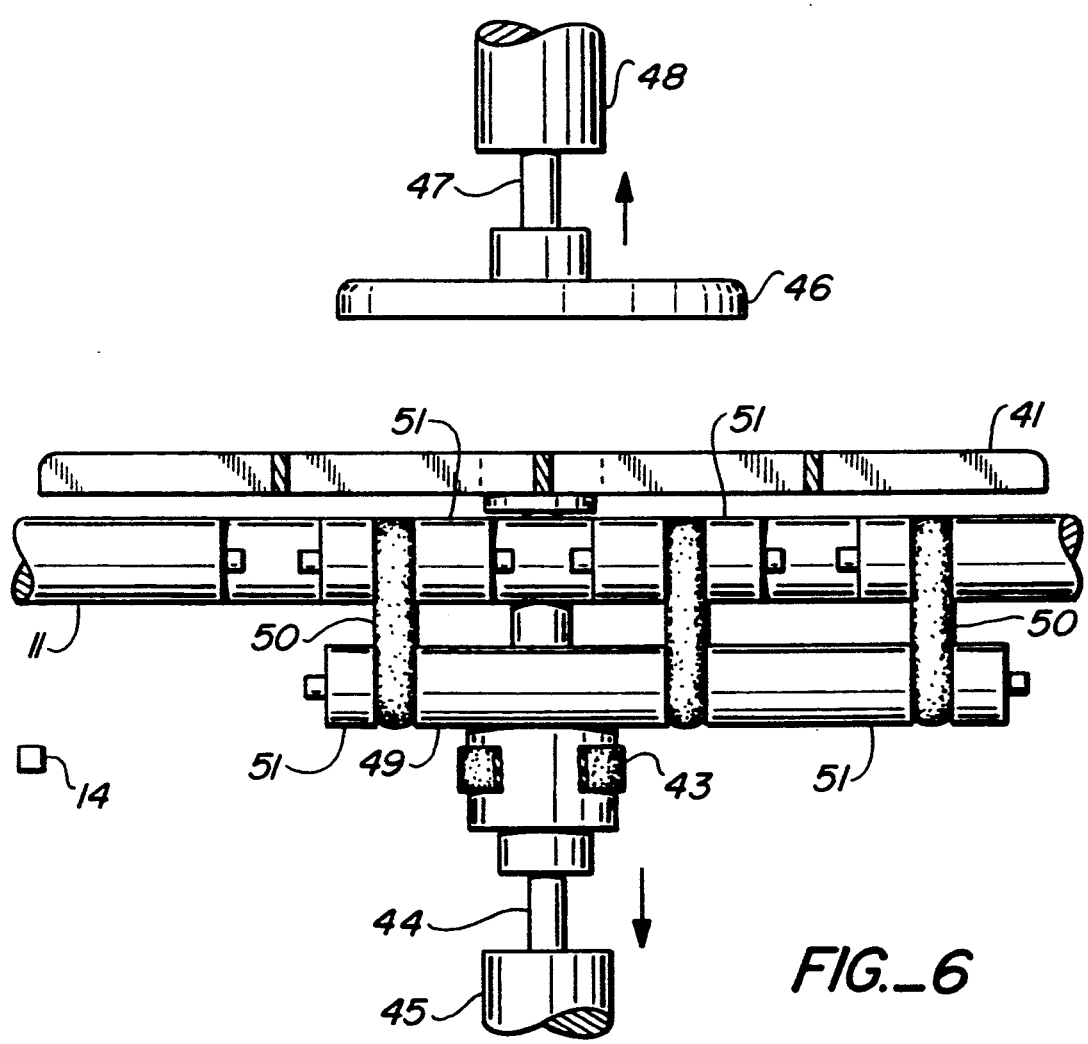
FIG._6

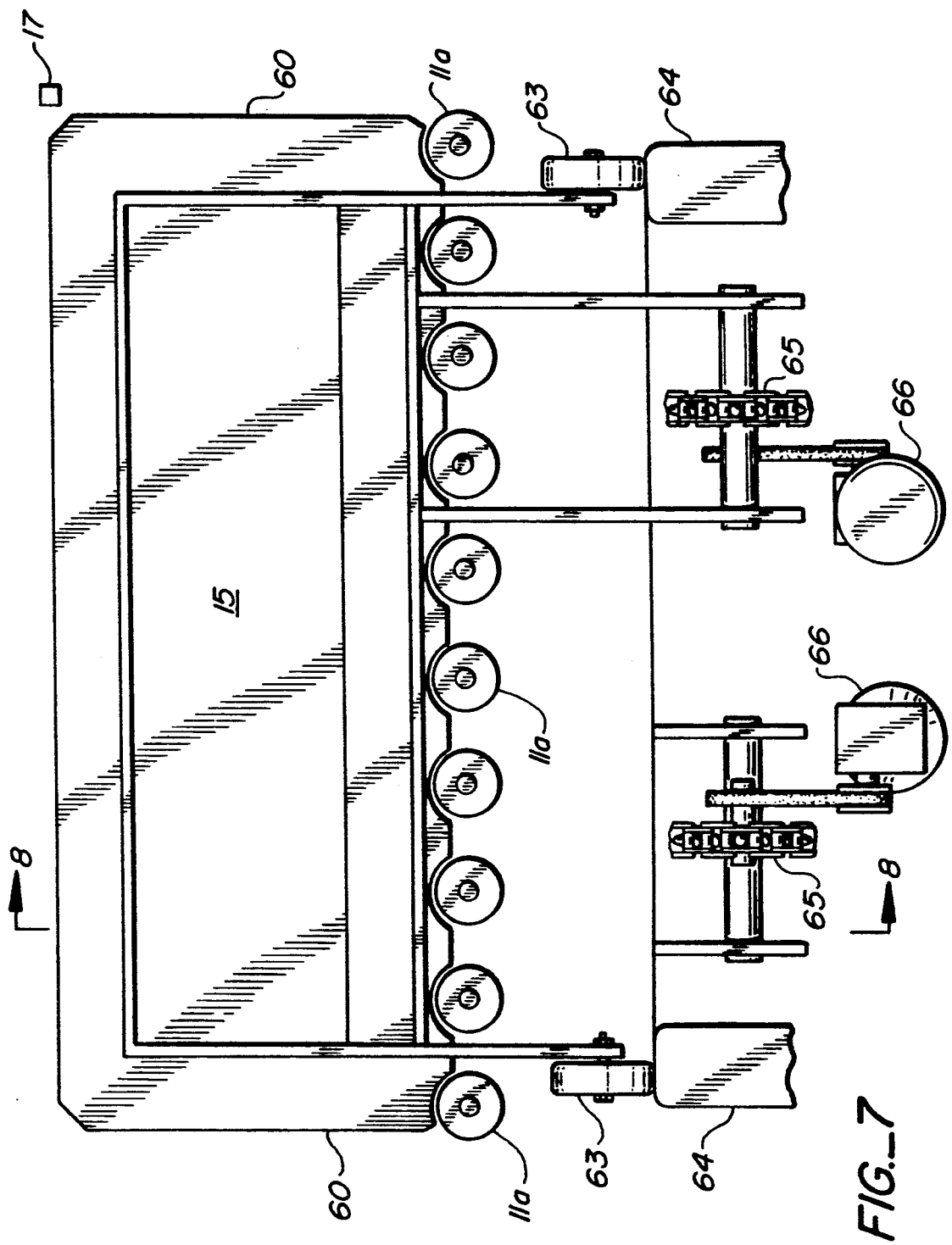

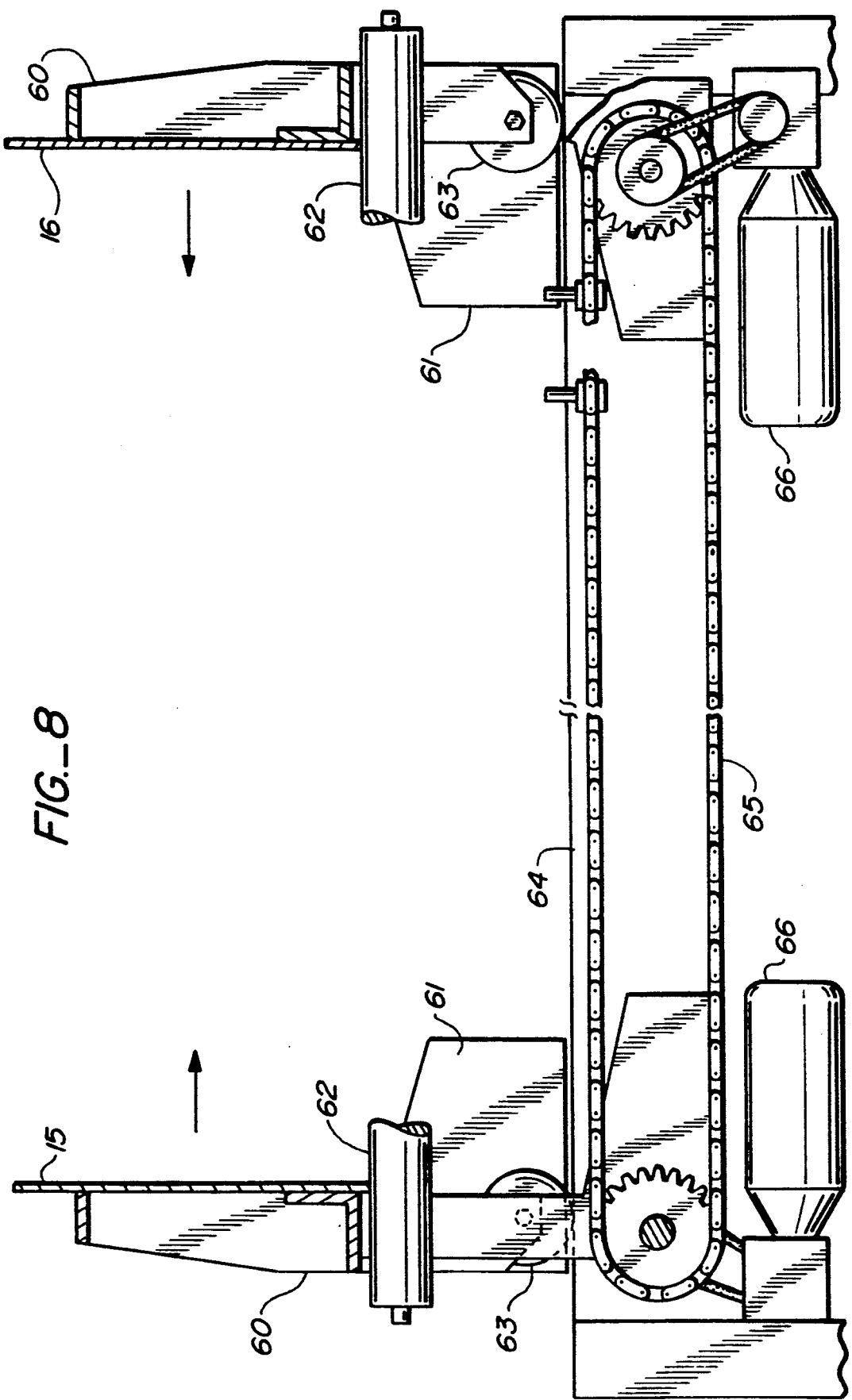

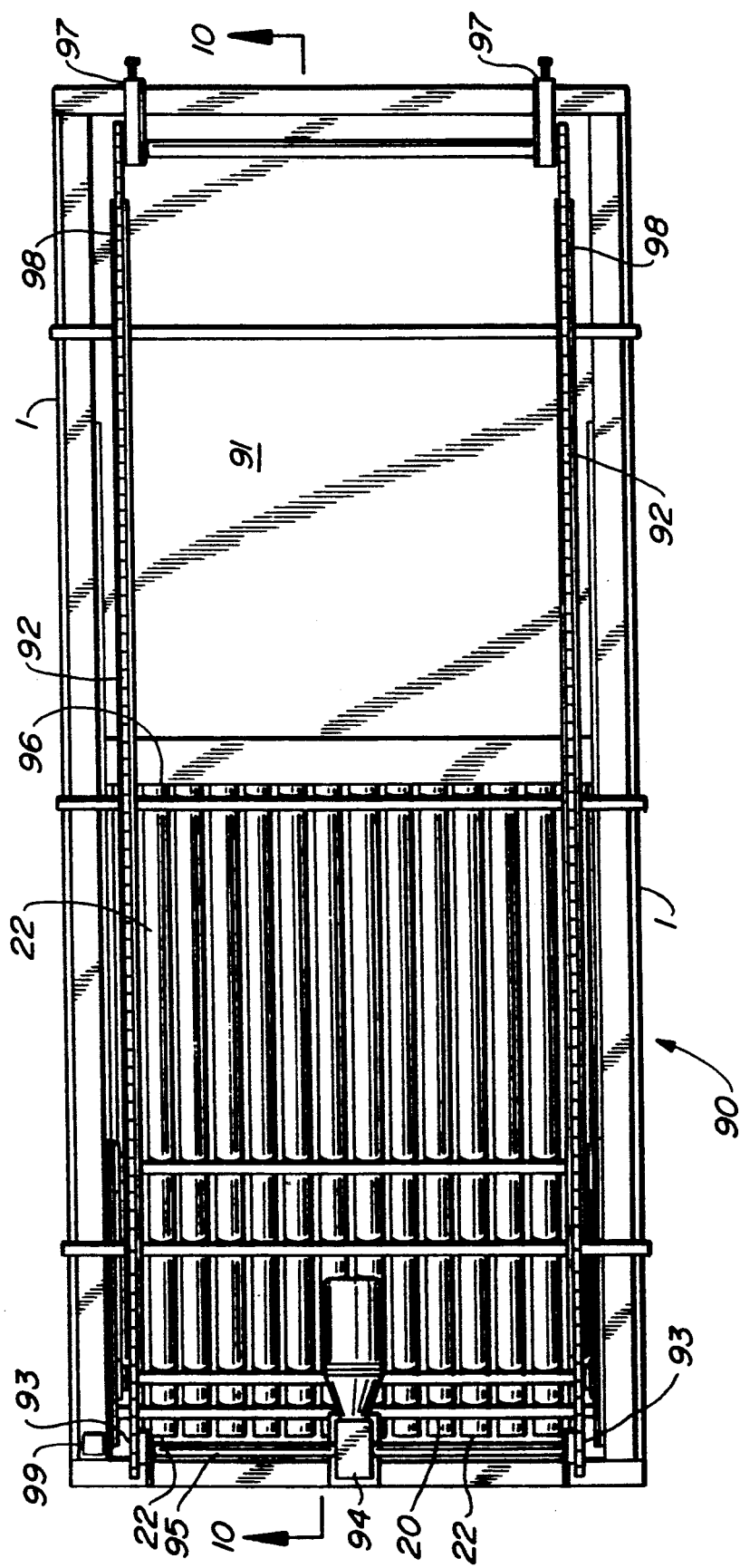
FIG._9

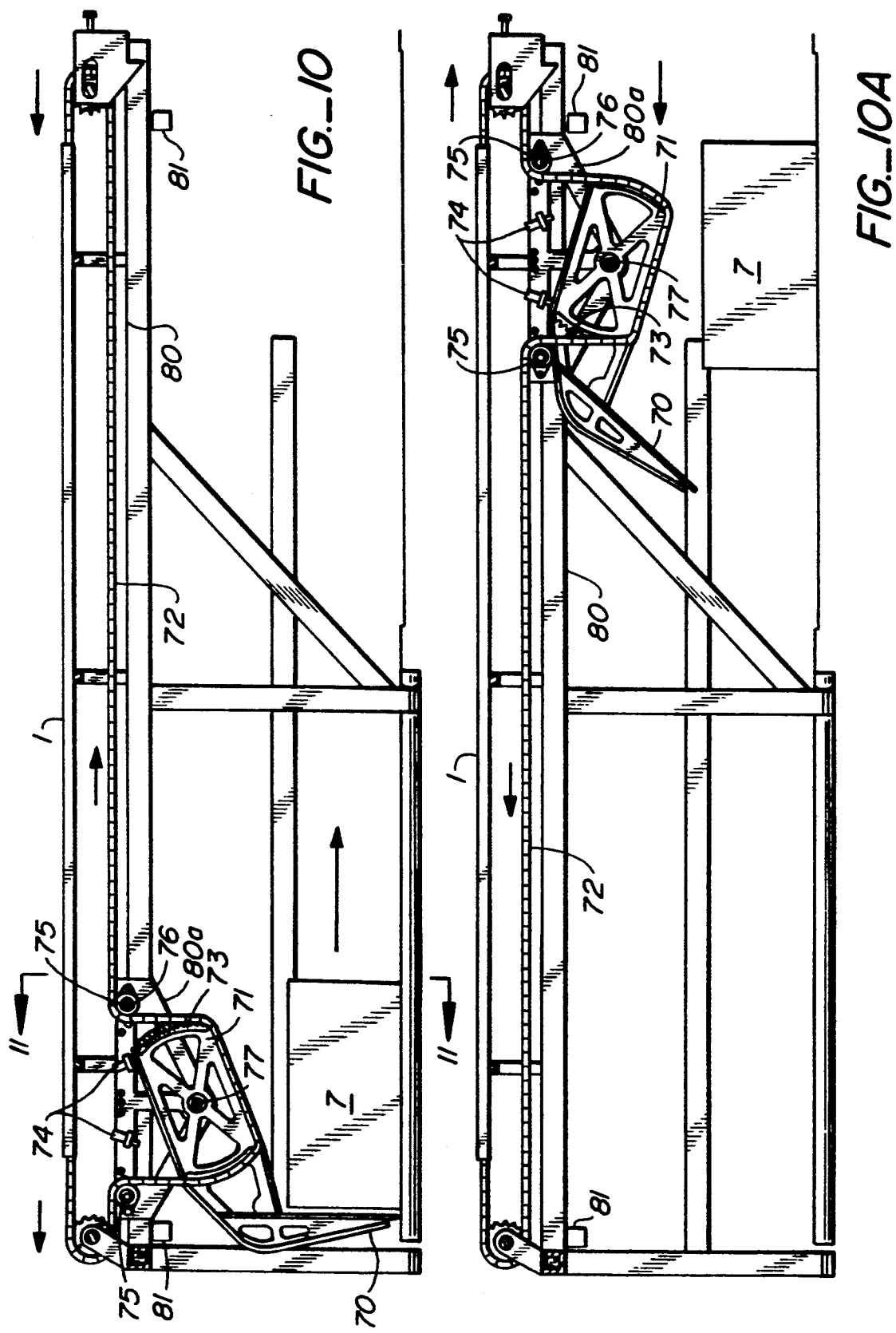

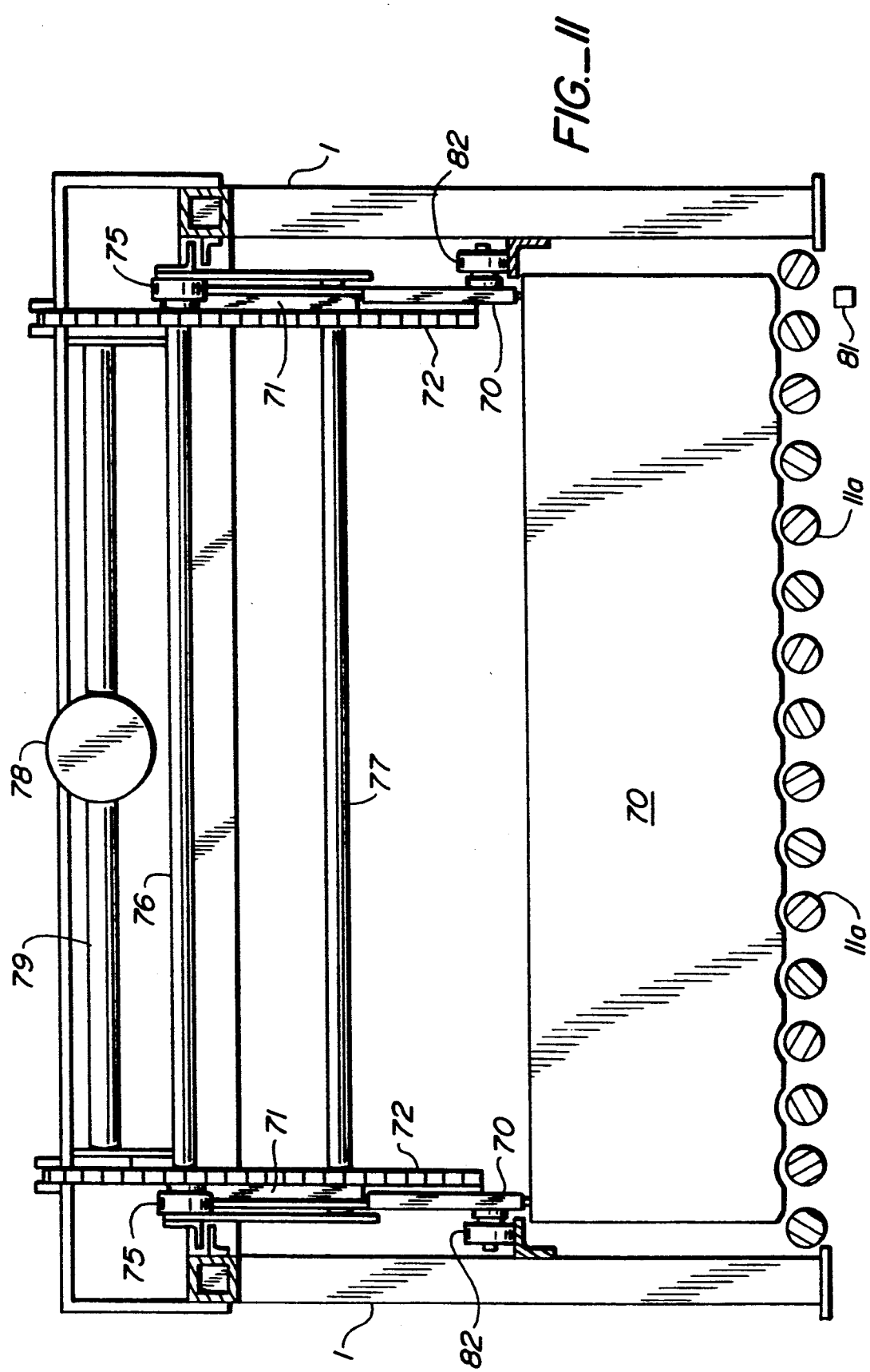

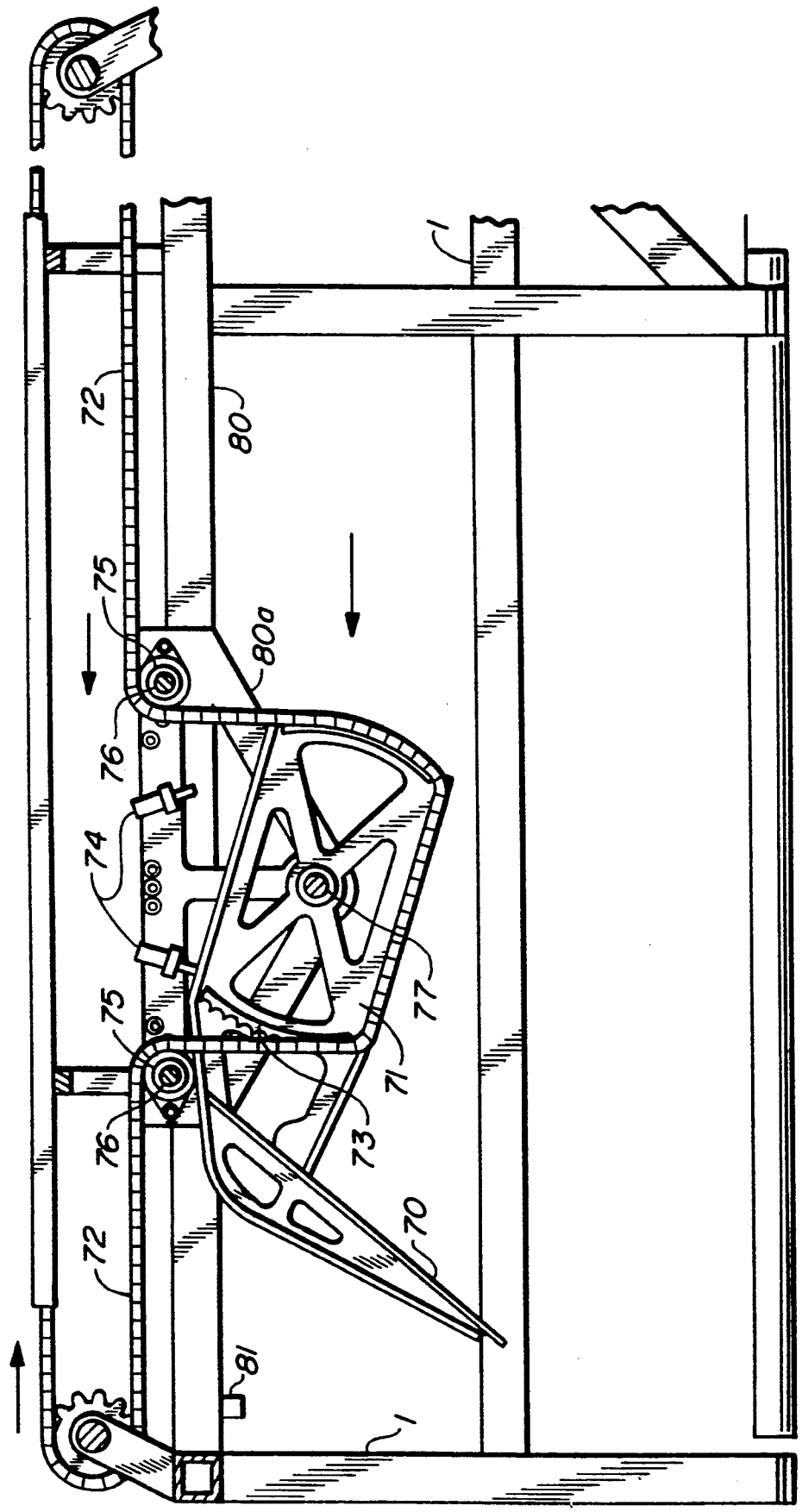
FIG._12

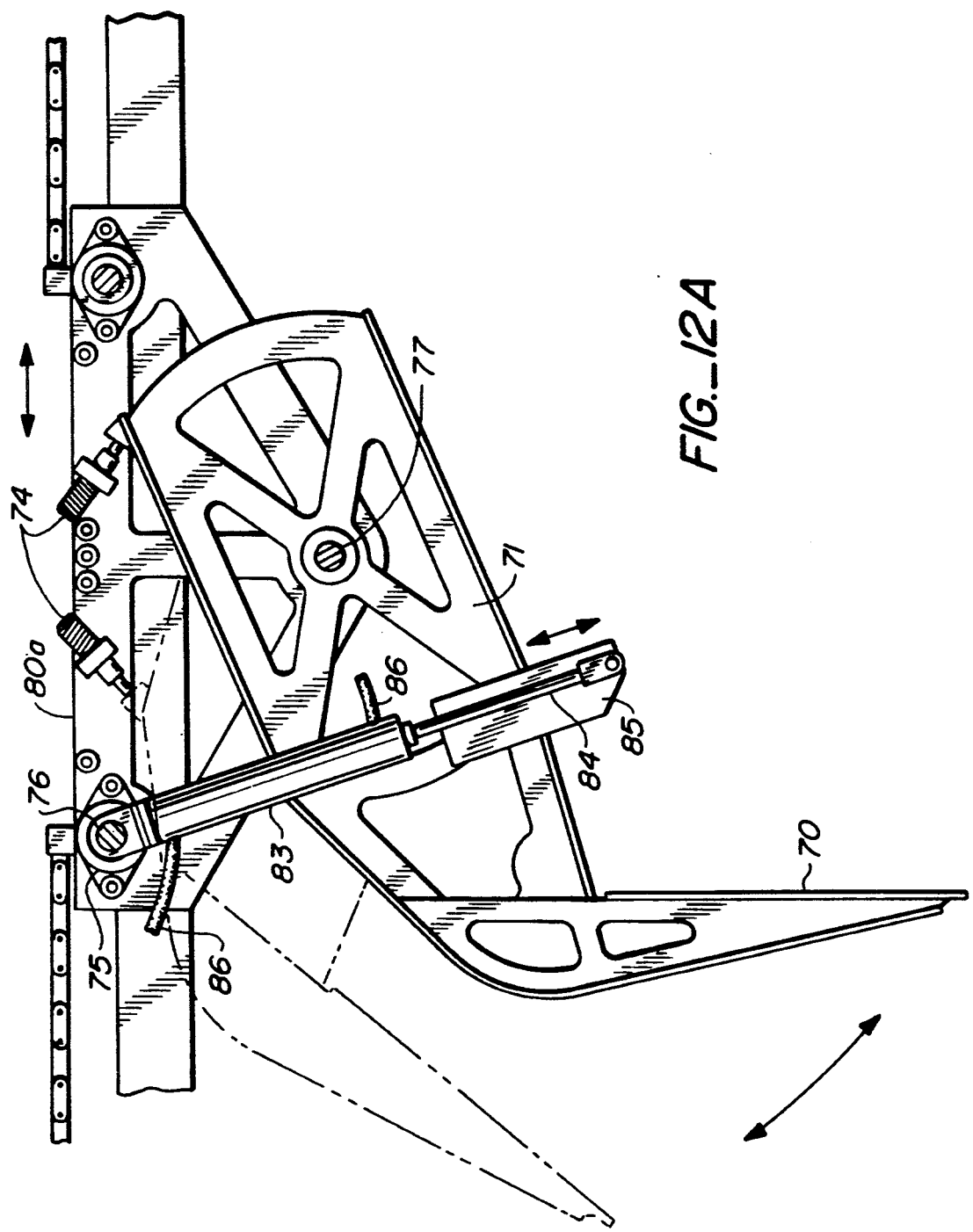
FIG._12A

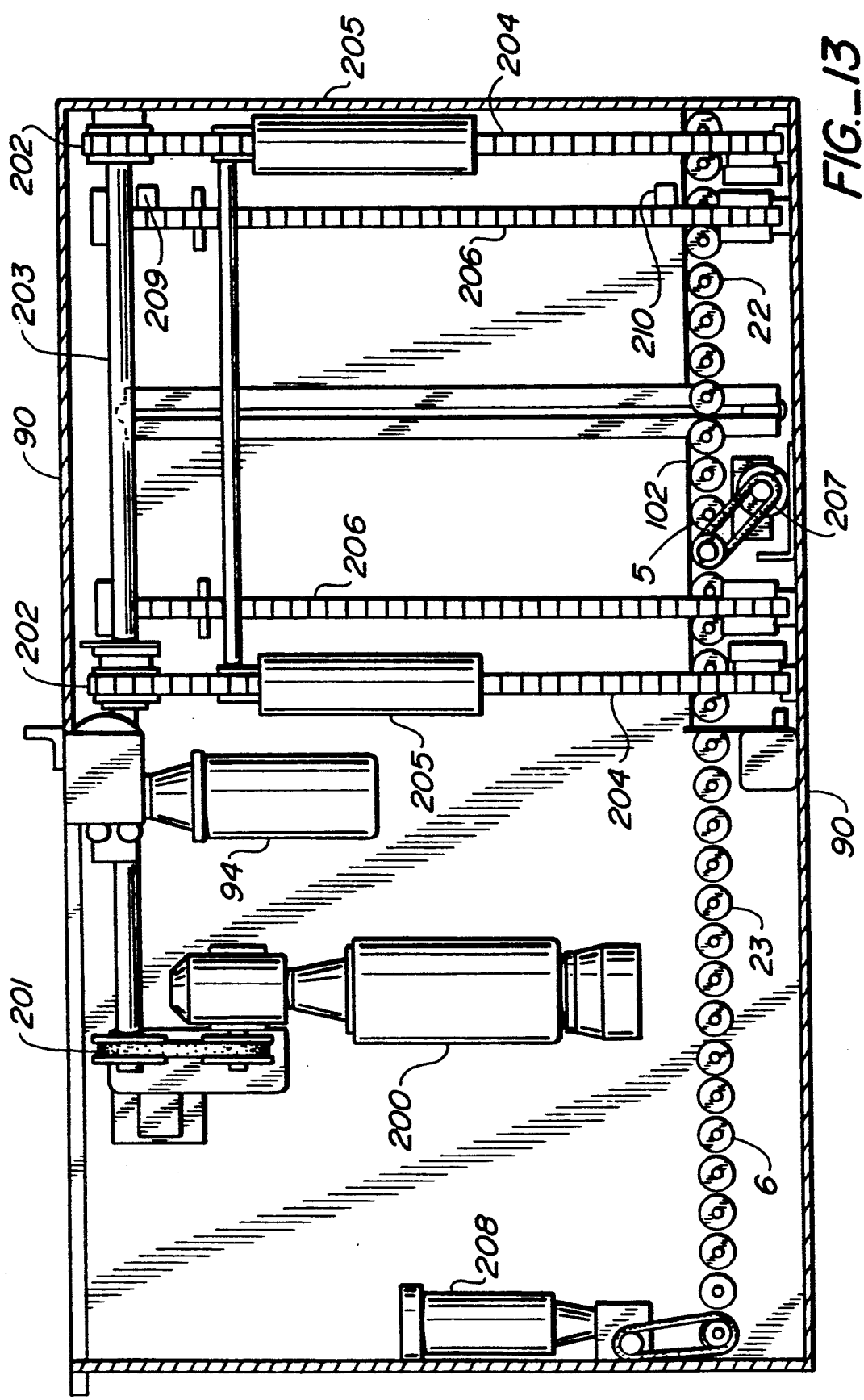
FIG._13

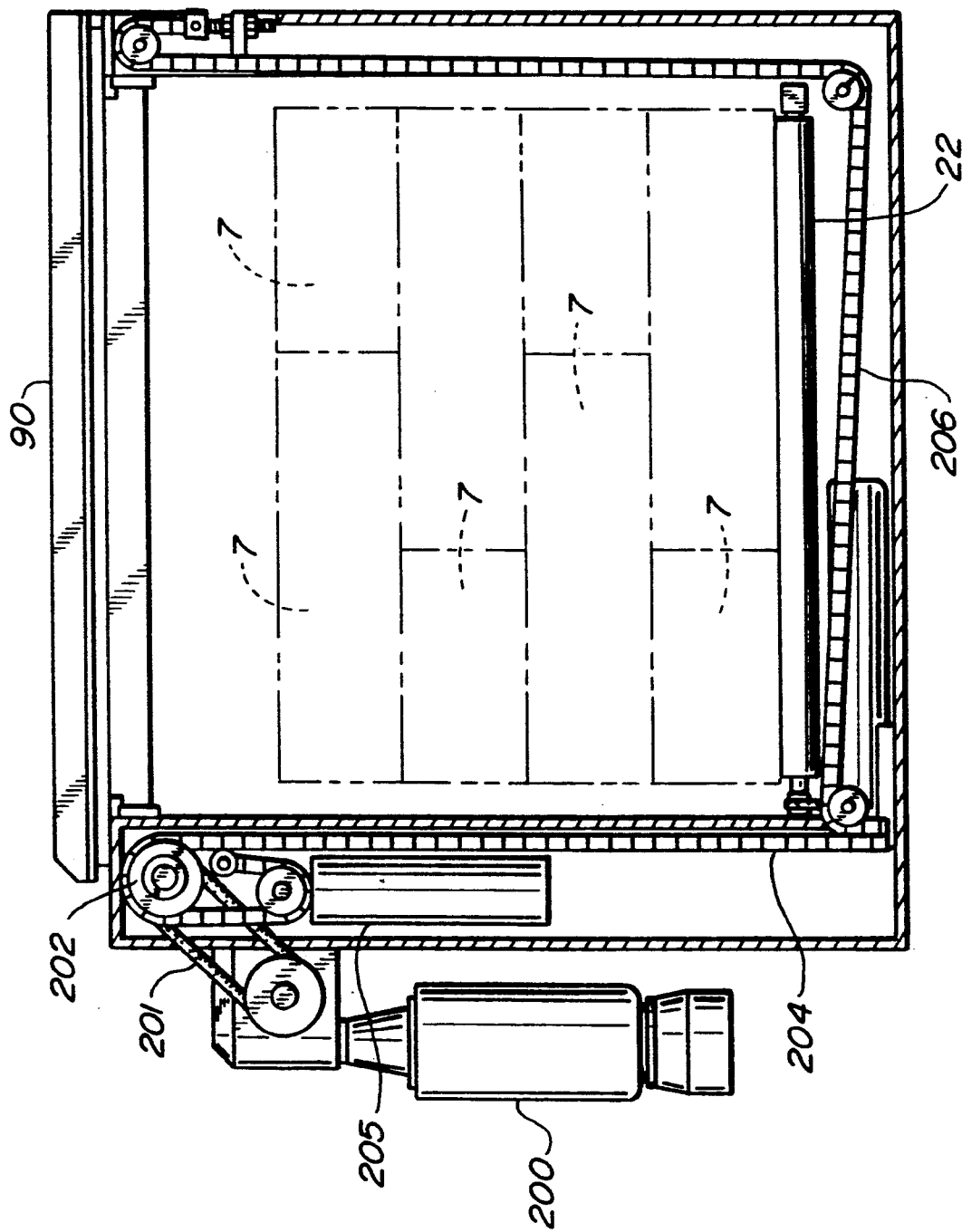
FIG._14

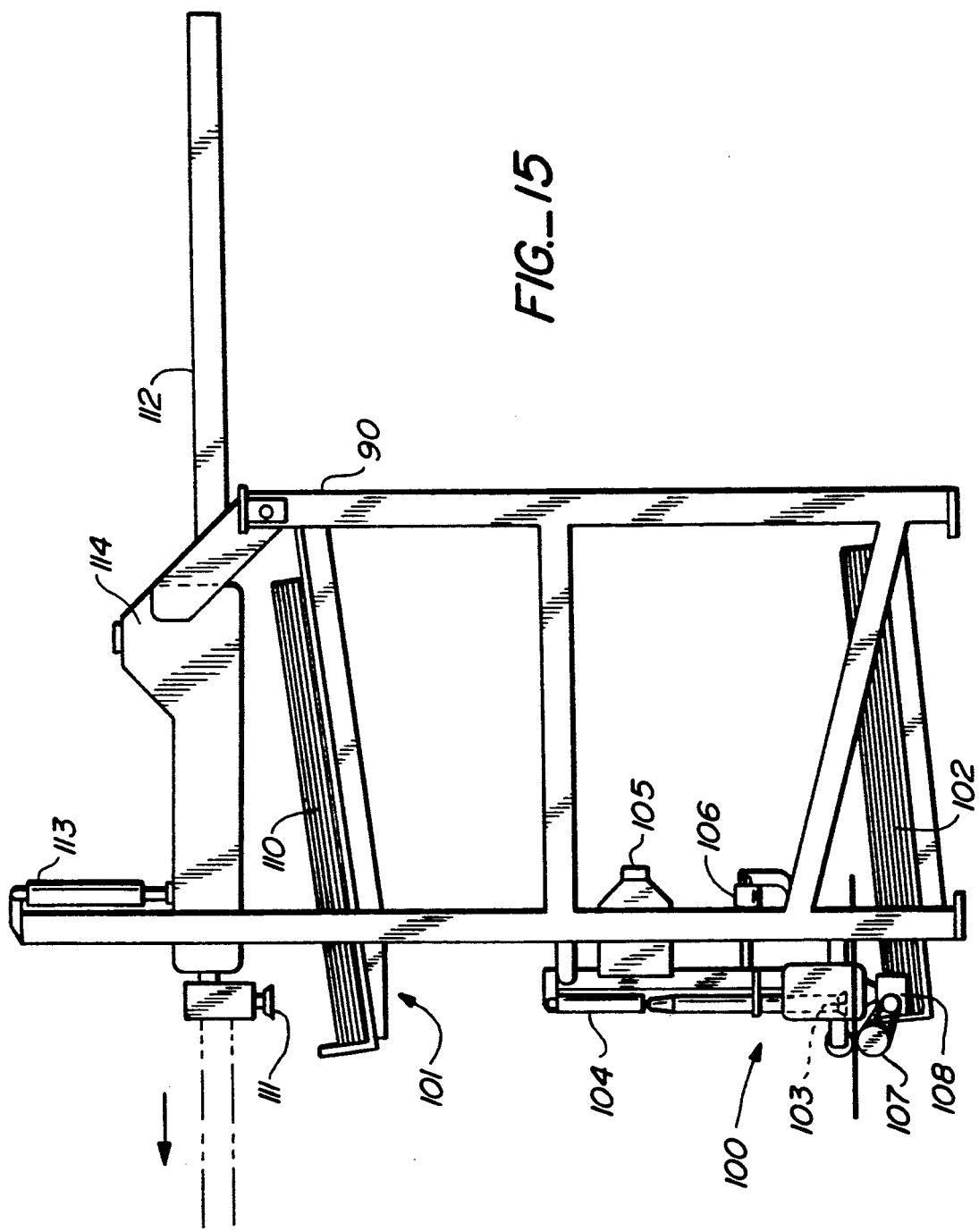

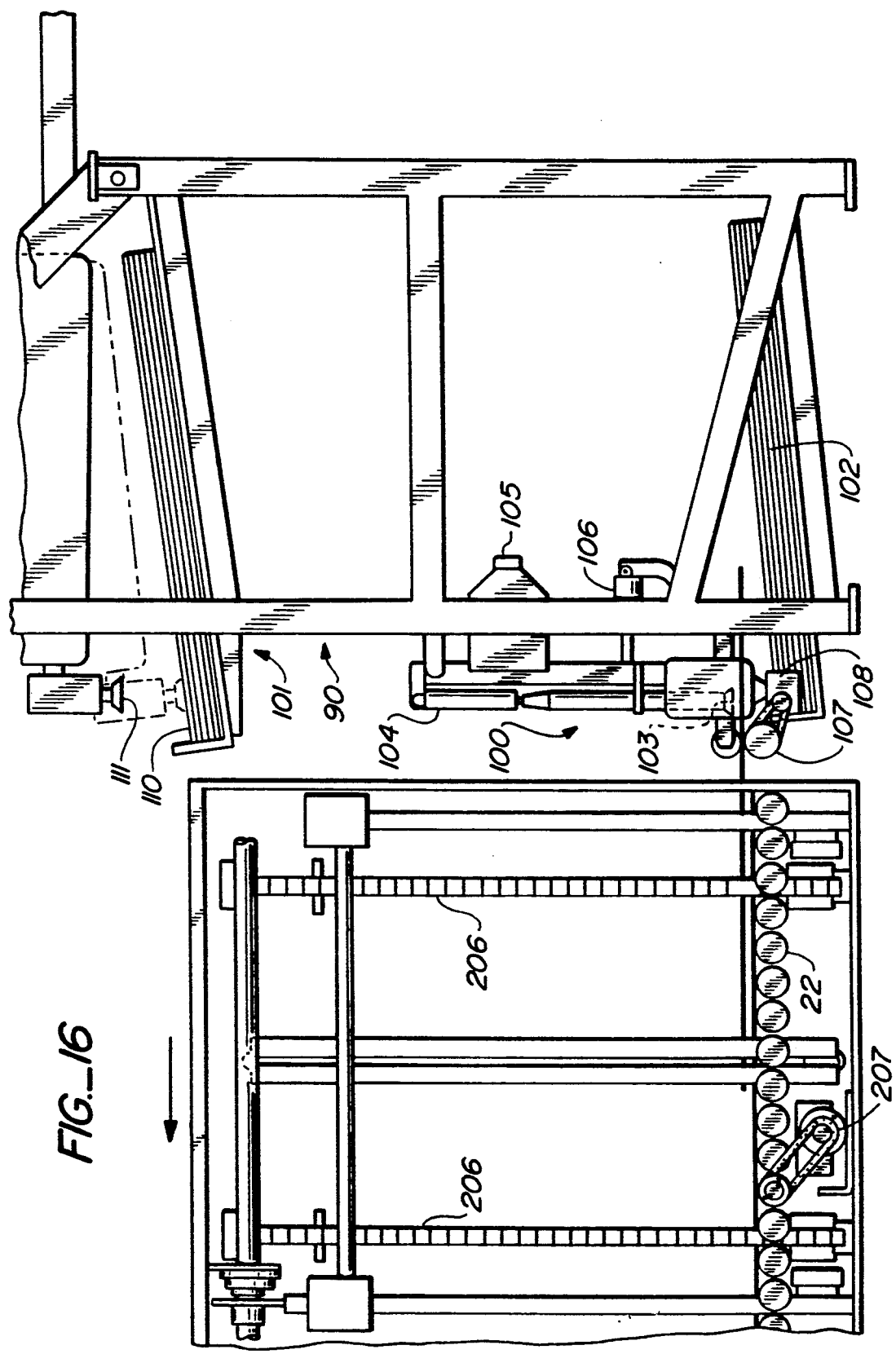

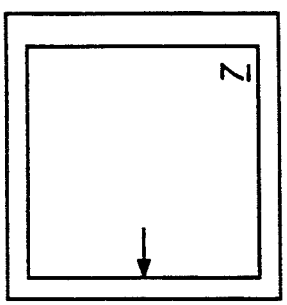
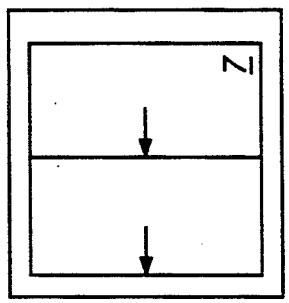
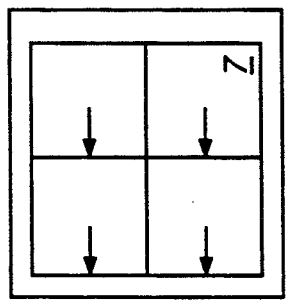
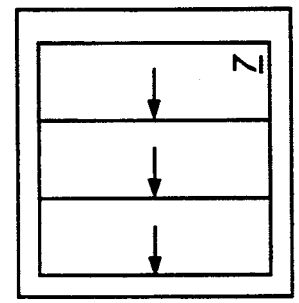
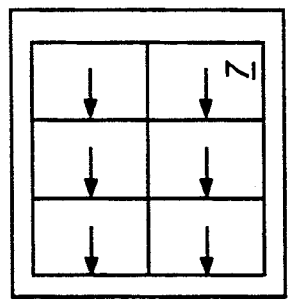
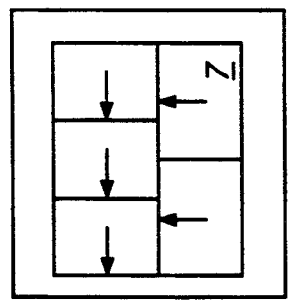
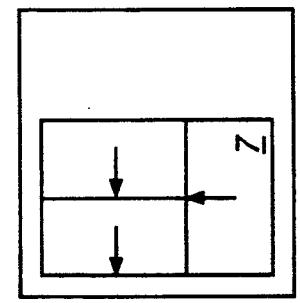
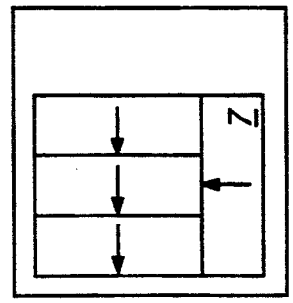
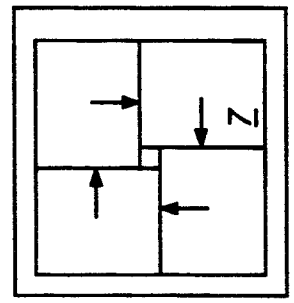
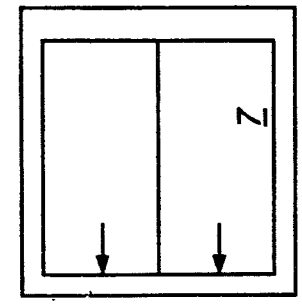
FIG._17

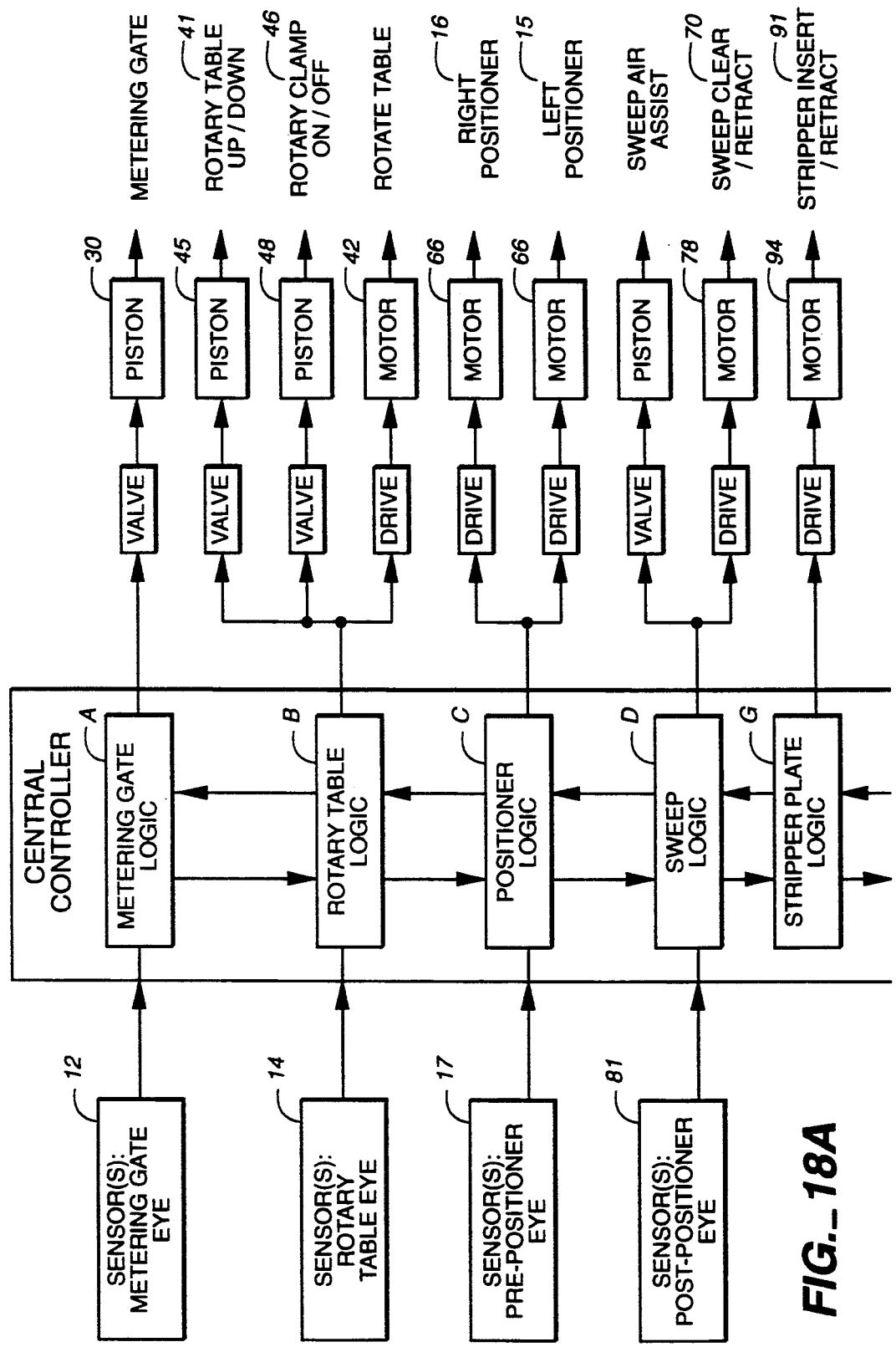
FIG._18A

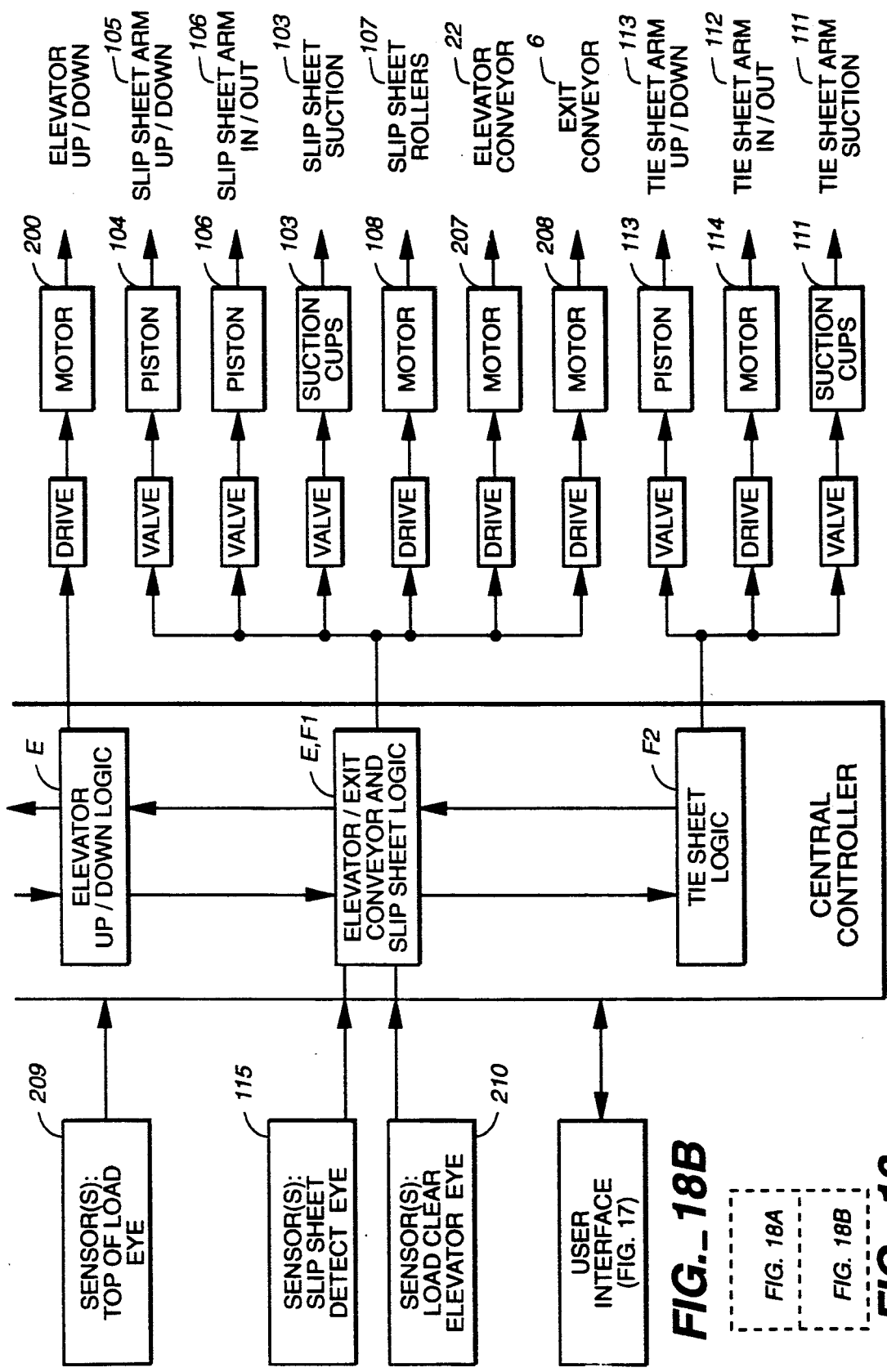
FIG._18B
FIG. 18A | FIG. 18B
FIG._18

LOAD FORMER—PALLETIZER

FIELD, BACKGROUND OF THE INVENTION, AND PRIOR ART

In many production operations it is customary to load the products of the operation usually upon pallets for transportation, sometimes by forklift trucks to final points of disposition to warehouses or other facilities.

It has been the accepted practice to pile the items up by hand upon the pallets. The items are usually of rectangular cross-section such as boxes or cartons or sometimes loose bundles of items such as knocked-down flat corrugated paper cartons, as is common in that industry. This involves considerable labor cost and time factor and places a substantial burden on the efficiency of the overall operation of the business.

The most relevant prior art known to applicant directed to this problem is represented by the Pulda U.S. Pat. No. 4,311,425 which is concerned primarily with manual operations and does not teach any automation.

Applicant is not aware of any successful attempt to automatically effect the load forming and palletizing of loads or stacks described herein.

SUMMARY OF THE INVENTION

Applicant has invented a machine which automatically forms a load of boxes, bundles, containers, or cartons and delivers them for final disposition. For our purposes here these items will be referred to by the generic term "packages" whether they are integral or loose bundles as described above.

I employ a combination of conveyors arranged in series with an elevator and in combination with accompanying devices to form such loads and deliver them to a pallet for other disposition automatically.

I first select a desired pattern of arrangement of my rectangular shaped packages for each layer of my load. This is fed into my computerized central controller.

I then provide a gate to control the flow of my packages to the conveyors. A rotator positions each package in a required angular position to comply with my selected pattern. A positioner then positions each package laterally also in the relative position selected according to the pattern desired.

My packages are then conveyed to a further or sweep conveyor and stripper plate where they are transferred to the platform of a descending elevator by a novel combination of mechanisms. At this point I provide also for inserting separation sheets between the successive layers of packages as well as the bottom of the stack to insure proper alignment and handling of the stacks or loads.

After the elevator has completed its descent with a complete load or stack of successive layers of systematically arranged packages, the roller conveyors comprising the platform of my elevator discharges the load to a run-out conveyor, thence to pallets or other disposition.

DESCRIPTION OF THE DRAWINGS

FIG. 1 is an isometric overall view of my machine showing the general arrangement and relationship of the main individual components comprising my machine.

FIG. 2 is a front election view of metering gate "A" in position between the rollers of conveyor 2.

FIG. 3 is a side elevation partly in section of the gate "A" of FIG. 2.

FIG. 4 is a plan view of rotator "B" positioned on conveyor 2a.

FIG. 5 is a section along 3—3 of FIG. 4 showing the method of driving for rotator "B".

FIG. 6 is a front elevation of the rotator of FIG. 5.

FIG. 7 is a side elevation of one of the side plates of positioner "C" positioned on conveyor 3.

FIG. 8 is an end elevation of positioner "C" showing both side plates and method of drive FIG. 9 is a plan view of sweep conveyor 4 and stripper plate "G".

FIGS. 10 and 10A are side elevations of the mechanism of sweep "D" in two positions showing the chain drive.

FIG. 11 is an end elevation of sweep "D".

FIG. 12 illustrates the operation of the pushing arm of sweep "D".

FIG. 12a illustrates an improved embodiment of FIG. 12 with air cylinder.

FIG. 13 is a side elevation of the elevator "E" and run-out conveyor.

FIG. 14 is an end view of the elevator of FIG. 13 showing the drive.

FIG. 15 is a side elevation showing the sheet feeders "F-1" and "F-2".

FIG. 16 is a side elevation of the sheet feeders of FIG. 15 shown in combination with the elevator "E".

FIG. 17 is a diagram showing typical patterns of combinations of packages or bundles for load formation of the many that may be used.

FIGS. 18–18B are control charts illustrating the controls of my invention.

DESCRIPTION OF A PREFERRED EMBODIMENT

General Description

Referring first to FIG. 1 there is shown a basic structure 1 of generally right angular configuration. This structure supports a number of conveyors, namely a feed conveyor 2, a rotator conveyor 2a, connecting with a positioning conveyor 3 and thence to a sweep conveyor 4 and elevator conveyor 5 and finally to run-out conveyor 6. Positioned in operative relation with the aforesaid conveyors are the following principal components of my machine.

On conveyors 2 and 2a there are seen metering gate "A" and rotator "B" respectively. On conveyor 3 there is seen positioner "C" thence to transfer sweep "D" conveyor 4. Here there is sweep "D" leading to conveyor 5 which forms a part of the platform of elevator "E" and thence to run-out conveyor 6.

Interposed between sweep "D" and elevator "E" are lower or bottom slip sheet feeder "F-1" and intermediate or tie sheet feeder "F-2". Also interposed is stripper plate "G" in between conveyor 4 and platform 5 of elevator "E".

OPERATION

FIG. 1

The above components form a novel combination which forms a load comprising successive layers of packages or bundles 7 for delivery to a pallet or other disposition accomplishing the objects of my invention as set forth above.

The construction, function, and operation of all of the above individual components is set forth in more detail below.

First, a pattern for the desired arrangement of each of the successive layers, depending on the sizes and the relative positions desired for the packages, is selected from a chart such as that shown on FIG. 17. From this the operation of the various machine components to effect the selected arrangement is programmed on a programmable logic controller as described herein below and set forth on FIG. 18.

The packages 7 are fed one by one to the center line of feed conveyor 2 which is of a conventional type comprising a plurality of rollers 11 driven continuously at a predetermined speed by chains and sprockets (not shown). Successive conveyors are of identical construction except that rollers 11a of conveyor 3 may be geared to run at somewhat higher speed to permit time for proper operation of gate "A". Gate "A" is pneumatically solenoid operated to control the rate of feed to the machine through operation of eye sensor switch 12 and is shown in more detail on FIGS. 2 and 3.

When gate "A" drops, bundle 7 is conveyed to rotator "B" which comprises a section of conveyor 2a arranged to operate as a rotating table disposed to raise and turn packages 7 through the desired number of degrees usually 90° or 180° while being held in position by rotary clamp 13, all when activated by optical sensor 14 and described in detail on FIGS. 4, 5 and 6.

Package 7 then proceeds to positioner "C" on conveyor 3. This comprises a pair of vertical clamps or position 15 and 16 disposed to grasp package 7 by its parallel sides in the direction of travel and position it at predetermined position laterally on conveyor 3 to effect its ultimate selected position in the layer when actuated by optical switch 17. Its detailed construction of operation will be understood from FIGS. 7 and 8.

After being placed in the pre-selected position, the positioners are retracted and the package proceeds on to sweep and discharge conveyor 4 until it contacts stop 18 at the side of sweep conveyor 4.

When a layer of packages has been completed the sweep component "D" goes into operation to form the layer into a stack of successive layers. The actual sweep "D" is shown on FIGS. 10, 10A, 11 or 12 and 12A. Before the movement of the layer can be made to form a stack several auxiliary operations are performed. It is known that a bottom or slip sheet of relatively heavy cardboard is desirable for proper formation and transport of the stack. It is also known that it is desirable to insert light weight tie sheets between successive layers to preserve the integrity of the stack. These sheets must be inserted during the time that the layers are being transferred to form the stack. These operations are performed by sheet feeder components "F-1" and "F-2" of the machine and are shown on FIGS. 15 and 16.

The stack is formed on the platform 5 of elevator "E" which is a component of the machine and is shown and described on FIGS. 13 and 14. The layers of packages are not packed directly onto the elevator platform but onto a reciprocating stripper plate shown on component "G" of the machine and shown and described in detail on FIG. 9. When the layer of packages is being formed on sweep conveyor 4, plate "G" is positioned at the discharge end of conveyor 4 ready to receive a layer from sweep "D".

At the start of the stack forming operation, platform 5 of elevator "E" is at the bottom of its travel. At a given signal at this point sheet feeder component "F-1" feeds a slip sheet of stiff cardboard 19 onto the platform of elevator "E".

Platform 5 of elevator "E" then rises to the top of its travel just below the elevation of sweep conveyor 4.

When the formation of the layer on conveyor 4 is complete, sweep "D" pushes it onto stripper plate "G" until it strikes stop 20. Plate "G" is then withdrawen and the layer drops onto the slip sheet convering elevator platform 5. Sweep "D" is then withdrawn and the formation of a succeeding layer on conveyor 4 is commenced.

The process is repeated for the succeeding layers. A tie sheet of paper may optionally be inserted after the stripper "G" has been retracted and the elevator has stepped down so that the top of the current load is below the stripper. After the tie sheet has been inserted, the stripper "G" is inserted and the elevator is raised so the load is slightly pressed against the under side of the stripper "G". At this point a newly formed layer on the sweep conveyor may be swept onto the strippler plate.

When the stack or load is complete, elevator platform 5 is at the end of its travel at the bottom. Live conveyor rollers 22 of a conventional type, motor driven through chain drive as previously described, and which comprise the platform 5, propel the stack to run-out conveyor 6. This is comprised of similar rollers 23 and delivers the stack to a waiting pallet or to other disposition.

DETAILED DESCRIPTION

Gate "A" (FIGS. 1, 2, and 3)

Referring now to FIGS. 1, 2 and 3 there is seen first the gate proper 25 which is essentially a flat plate positioned between rollers 11 of conveyor 2. Structural member 26 which form a part of principal structure 1 is shown below rollers 11. Support bar 27 for plate 25 and support knob 28 connects with operating shaft 29 which in turn connects with operating cylinder 30. Not shown but positioned inside cylinder 30 is solenoid operated air piston which is activated by optical electrical switch 12.

The electrical switch is actually tied into the central controller which in turn controls the solenoid operated air piston using this information along with other information. Guide shaft 31 controls the movement of plate 25 to guides 32 as limited by stops 33.

Rotator "B" (FIGS. 4, 5, and 6)

Referring now to FIGS. 4, 5, and 6, there is seen a rotator which essentially forms a part of the rollers 11 of conveyor 2a. The rotator itself comprises what amounts to a table having a frame 41, a drive motor 42, a transmission or drive 43 which may be a belt as shown, and a shaft 44 supporting frame 41. Shaft 44 is operated by a solenoid actuated pneumatic piston located within cylinder 45 which is disposed to raise the entire table including the frame and rollers up and down pursuant to the control signals 14.

A rotary cylindrically shaped flat clamp 46 held by shaft 47 which connects with cylinder 48 in which there is located also a solenoid operated pneumatic piston. This mechanism is disposed to hold a package in position on the table while it is being rotated.

Table feed rollers 49 are belt driven from principal conveyor rollers 11 by belts 50. Table rollers 51 serve to propel the package while it is on the table and are driven by belts 52 which in turn receive their drive from main conveyor rollers 11 as shown. Take-away rollers 53 driven by belt 54 which in turn are powered from main conveyor rollers 11 serve to feed the packages from the rotator to successive conveyors.

It is thus seen that packages approaching on conveyor 2a are delivered to rotator table 41 where they are raised vertically by shaft 44 and then rotated in a horizontal plane by the action of motor 42 while held in position by rotary clamp 46 and then returned to the table 41 at the desired angle or position from where they are delivered to successive conveyors. The operation is controlled by operating control switch 14 which forms a part of the general system as, described elsewhere herein.

Positioner "C" (FIGS. 7 and 8)

In FIGS. 7 and 8 there are seen positioning member 15 and positioning member 16 located on conveyor 3 and the usual conveyor rollers 11a. These are designated as left positioner plate and right positioner plate respectively and comprise flat plates disposed to grasp the sides of the package 7. The plates are held in position on support member 60 and include stops 61 and operating shaft 62. Rollers 63 provide for the transverse motion of the plates on guides 64. Chain drive 65 provides for the movement of the positioning plates and is driven by motors 66 which are the gear head type.

At the start of the operation position plates 15 and 16 are wide apart on opposite sides of conveyor 3. Package 7 enters and when acuated by operational switch 17 plates converge and grasp the package. This movement is effected by the operation of the first motor 66 on plate 15. The movement of both plates and to obtain the proper lateral position is effected through the action of second motor 66 which then effects the motion of both plates which may be seen from FIG. 8.

Sweep "D" (FIGS. 10, 10a, 11 and 12)

Following the positioner previously described the package moves on conveyor 4. Package 7 moves across conveyor 4 until it strikes stop 18. Associated with conveyor 4 is pusher plate 70 with its operating arm shown. Swivelling member 71 forms a part of pusher plate 70 and engages chain 72. Chain 72 is driven by a motor 78 which engages teeth 73 forming a part of swivelling member 71. Dashpots 74 control the swivelling motion of member 71 which pivots on the structure of pusher arm 70. Idle rollers 75 positioned on shaft 76 guide the motion of pusher plate 70 and its arms across conveyor 4. Travel rail 80 serves to support the travel of pusher plate 70 and carriage 80a and support is furnished by support rollers 82 positioned on structure 1. Limit and control switch 81 is tied into the central control as mentioned hereinabove for the driving motor 78.

Sweep "D" —Alternate Embodiment FIG. 12a

In this embodiment I attain improved operation of pusher plate 70 by introducing an air assist cylinder 83, mounted on travel carriage 80a with an air operated piston and rod 84, operatively connected to swivelling member 71 through fastening plate 85. An air supply (not shown) is fed to air ports 86 on opposite ends of cylinder 83 through air ports 86 and controlled by three-way valves 87. The action of the air cylinder has the effect of smoothing the action of chain 72 on plate 70 and avoiding slamming.

Stripper Plate "G" (FIG. 9)

Stripper plate "G" serves to assist in depositing the layers of packages upon elevator platform 5 after they are discharged by sweep "D". This component forms a part of the main elevator structure 90 which is basically a part of the machine structure 1. Its principal element is a flat preciprocating aluminum plate 91 positioned on a pair of racks 92 driven by pinions 93 through geared head motor 94 and drive shaft 95. Rollers 96 support the travel of plate 91 in slides 98 against stops 97.

Plate 91 is positioned at the discharge end of conveyor 4 during the formation of the layer of packages 7 upon it. After the discharge of the layer by sweep upon plate "G" the latter is retracted and causes the packages to drop upon the platform of elevator 5 which at this point is in position to receive it. Plate "G" then remains in this retracted position until the elevator lowers the load below plate level. At this point a tie sheet may be optionally added. Upon completion, the stripper plate is inserted and the load is raised back up against plate "G".

Sheet Feeeders "F-1 and F-2" (FIGS. 15 and 16)

These elements whose function is described above form a part of the elevator frame 90 and in turn part of the main structure of the machine. The bottom or slip sheet feeder is shown at 100 and the top or tie sheet feeder is shown at 101. Heavy sheets are shown as positioned at 102 and a vacuum cup transporting mechanism at 103. The source of continuous vacuum is not shown. A solenoid operated pneumatic lift is shown at 104 and the lift control at 105. Retractor control is shown at 106 and feed rollers and belt at 107 with motor drive at 108. In regards to the central control system, the vacuum cup mechanism raises a sheet and feeds it to feed rollers and belt 107 driven by motor 108 all responsive to the central control.

A stack of light weight tie sheets is shown at 110. Vacuum cups 111 are connected to a continuous source of vacuum. Vacuum cups 111 are mounted on transport arm 112 which is likewise operated by solenoid actuated pneumatic lift mechanism 113 and motor and chain driven mechanism 114 for driving arm 112 horizontally. Responsive also to the central control the vacuum cup raises individual sheets from the stack 110 and transports them horizontally for deposit over a layer of packages when they are positioned at the top of the stack on elevator platform 5.

Elevator "E" FIGS. 13,14, and 16)

The elevator frame structure seen at 90 with rollers 22 are all previously described. The bottom or slip sheet 102 is shown in position. The elevator drive is seen at 200, the mechanical transmission at 201, the sprockets at 202, the shaft at 203 and the chains at 204. The counterweights are shown at 205 and the platform equalizing chains at 206. The drive for the platform roller 22 is shown at 207. The previously described rollers 23 for run-out conveyor and run-out conveyor itself is shown at 6, all previously described. The drive for the tun-out conveyor and transmission is shown at 208. Elevator operating switches which are also part of the general control system are shown at 209 and 210. Aside from the latter aspect most of the elevator construction elements are of a conventional type.

Machine Control (FIGS. 17 and 18)

On FIG. 17 a series of typical arrangements which the packages will bear on the stacks and pallets when completed. The arrangements are not all inclusive but many others may be utilized as desired. The arrangements are fed into the computerized control shown in the chart on FIG. 18 and labeled as "user interface". It may be referred to also as "operating interface".

On FIG. 18 the logic of the principal components "A" through "F-2" described in the figures and specification are indicated on the central controller. The energizing elements or sensors 12, 14, 17, 81, 209, 115, and 210 shown elsewhere in the corresponding figures and described in the specification are indicated as inputs to the controller.

The actuating means for the components such as motors, pistons, valves, etc., which are identified by their corresponding numbers in the corresponding figures and specification are shown as output from the central controller.

The operation of the invention is thus made clear.

An added feature of the machine's logic is that the central controller is programmed to permit gradually changing the speed of the release time for each operation to accommodate different sizes of packages and thus maintain proper timing. This proper control of the admission of packages to the admission gate of the machine prevents operations interefering with one another. This is a self-tuning feature evident from the foregoing description.

I claim:

1. A machine for positioning a number of individual packages into an arrangement of layers and forming a stack thereof comprising:
    - a plurality of power driven roller conveyors mounted in series on a structure for successive handling a flow of said packages thereon;
    - said conveyors interconnected to effect the successive flow of said packages from one conveyor to another;
    - a first of said conveyors having a vertically moving control gate operatively connected thereto to control a flow of packages thereon and to
    - a second of said conveyors connecting with said first of said conveyors and mounted to receive a flow of packages therefrom;
    - a rotator positioned on said second of said conveyors for rotating said packages in a horizontal plane about their vertical axes to a predetermined angular position on said second of said conveyors, said rotator comprising:
    - a separate section of said second conveyor rollers mounted for movement in a vertical direction and comprising a plurality of separate rollers;
    - means operatively connected to said power driven rollers to drive said separate section of rollers;
    - means for raising and lowering said separate section of rollers;
    - means for rotating said separate section of rollers in a horizontal plane while in a raised position to a predetermined angular position;
    - means associated with said second conveyor for holding said packages in position against said separate section of rollers while said rotator is in operation;
    - a third of said conveyors connecting with said second of said conveyors and arranged to receive a flow of packages therefrom;
    - a lateral positioner positioned on said third of said conveyors for positioning said packages trasversely across said third of said conveyors to a predetermined transverse location thereon;
    - a fourth of said conveyors connecting with said third of said conveyors and mounted to receive a flow of packages therefrom;
    - a vertical stop positioned at one end of said fourth of said conveyors positioned to arrest said flow of said packages thereon thereby forming a plurality of layers of said packages in succession on said fourth of said conveyors;
    - means for transporting said layers successively from said fourth of said conveyors.
    - means for depositing said layers successively on the platform of a descending elevator positioned at one end of said fourth of said conveyors;
    - means for inserting separating sheets of paper between said layers as they are being deposited on said platform of said elevator;
    - thereby forming a stack of said packages.

2. A machine for positioning a number of individual packages into an arrangement of layers and forming a stack thereof comprising:
    - a plurality of power driven roller conveyors mounted in series on a structure for successive handling a flow of said packages thereon;
    - said conveyors being interconnected to effect the successive flow of said packages from one conveyor to another;
    - a first of said conveyors having a vertically moving control gate operatively connected thereto to control a flow of packages thereon and to
    - a second of said conveyors connecting with said first of said conveyors and mounted to receive a flow of packages therefrom;
    - a rotator positioned on said second of said conveyors for rotating said packages in a horizontal plane about their vertical axes to a predetermined angular position on said second of said conveyors;
    - a third of said conveyors connecting with said second of said conveyors and mounted to receive the flow of packages therefrom;
    - a lateral positioner positioned on said third of said conveyors for positioning said packages transversely across said third of said conveyors to a predetermined transverse location thereon, said lateral positioner comprising:
    - a pair of parallel vertical clamps positioned in opposite spaced relation to each other transversely on said third of said conveyors;
    - each of said clamps being mounted on a separate travel carriage;
    - a sprocket mounted on each of said travel carriages;
    - a chain operatively engaging both of said sprockets;
    - an electric motor mounted on each of said travel carriages and operatively connected to each of said sprockets;
    - means for operating said motors individually or simultaneously in either direction of rotation;
    - whereby said clamps may be moved simultaneously towards or away from each other transversely across said third of said conveyors;
    - and whereby said clamps may be moved simultaneously in the same direction transversely across said third of said conveyors;
    - said clamps being so positioned as to engage said packages;

thereby positioning said packages in a predetermined lateral position transversely on said third of said conveyors;

a fourth of said conveyors connecting with said third of said conveyors and mounted to receive the flow of packages therefrom;

a vertical stop positioned at one end of said fourth of said conveyors positioned to arrest said flow of said packages thereon thereby forming a plurality of layers of said packages in successtion on said fourth of said conveyors;

means for transporting said layers successively from said fourth of said conveyors;

means for depositing said layers successively on the platform of a descending elevator positioned at one end of said fourth of said conveyors;

means for inserting separating sheets of paper between said layers as they are being deposited on said platform of said elevator;

thereby forming a stack of said packages.

* * * * *